United States Patent
Hennessy

[11] Patent Number: 5,870,079
[45] Date of Patent: Feb. 9, 1999

[54] COMPUTER INPUT DEVICE AND CONTROLLER THEREFOR

[75] Inventor: Michael T. Hennessy, Roswell, Ga.

[73] Assignee: LegalTech, Inc., Norcross, Ga.

[21] Appl. No.: 788,598

[22] Filed: Nov. 12, 1996

[51] Int. Cl.⁶ .................................................. G09G 5/08
[52] U.S. Cl. ........................ 345/159; 345/157; 345/145
[58] Field of Search .................................. 345/157, 160, 345/103, 145, 146, 159

[56] References Cited

U.S. PATENT DOCUMENTS

| | | |
|---|---|---|
| 4,386,346 | 5/1983 | Levine . |
| 4,766,423 | 8/1988 | Ono et al. ............................... 345/159 |
| 4,812,819 | 3/1989 | Ebina et al. ............................ 345/159 |
| 4,931,783 | 6/1990 | Atkinson ................................ 345/146 |
| 5,012,231 | 4/1991 | Felsenstein . |
| 5,230,059 | 7/1993 | Nielsen et al. . |
| 5,298,890 | 3/1994 | Kanamaru . |
| 5,315,313 | 5/1994 | Shinagawa . |
| 5,469,191 | 11/1995 | Jay, III et al. . |
| 5,508,717 | 4/1996 | Miller . |
| 5,510,811 | 4/1996 | Tobey et al. . |
| 5,526,020 | 6/1996 | Campanelli . |
| 5,598,183 | 1/1997 | Robertson . |

FOREIGN PATENT DOCUMENTS

| | | |
|---|---|---|
| 0 665 489 A2 | 1/1995 | European Pat. Off. . |
| 0 670 541 A2 | 3/1995 | European Pat. Off. . |
| 0 671 682 A2 | 3/1995 | European Pat. Off. . |
| 01251218 | 3/1998 | Japan . |
| WO 93/22758 | 11/1993 | WIPO . |
| WO 96/35161 | 11/1996 | WIPO . |

*Primary Examiner*—Matthew Luu
*Attorney, Agent, or Firm*—Arthur A. Gardner & Associates, P.C.

[57] ABSTRACT

A computer input device, such as a mouse, and a method of operating the same. Initially, the location of the cursor at various times on the screen is detected. From these various positions a path of travel and a rate of travel of the cursor are computed. Display objects, such as buttons, which exist along or near the path of travel are identified and designated as potential targets. The rate of change in the rate of travel is also computed. This information is used to decide if a user is slowing down in approach of a specific screen display object. If certain deceleration criteria are met, then that target which the user is approaching is designated as the intended target and the cursor is translated smoothly to that target. After the pointer has been moved to the intended display object, the pointer is maintained at that object and small mouse movements are ignored, thereby allowing the user to maintain the cursor on the desired target despite small, possibly inadvertent, mouse movements. If the movement or acceleration of the mouse exceed a predetermined threshold, then this hold is released.

10 Claims, 2 Drawing Sheets

COMPUTER INPUT DEVICE AND CONTROLLER THEREFOR

TECHNICAL FIELD

The present invention relates generally to the field of input pointing devices and controllers therefor.

BACKGROUND OF THE INVENTION

Computer pointing devices, such as mice, are among the most popular devices for interfacing with a digital computer. This is especially true in a graphic user interface (GUI) environment. Generally, in a GUI environment the position of the cursor on the computer screen (which defines the user's point of interface with a particular software package) is directly controlled by the user by moving the mouse in two dimensions on a flat surface. Movements of the mouse correspond to the two-dimensional motion of the cursor on the screen. One problem with the use of a mouse in a GUI interface is the relative difficulty of selecting a specific screen object easily and quickly. In the past, several approaches have been tried to solve this problem. For example, U.S. Pat. No. 5,298,890 of Kanamarv. et al. teaches the technique of evaluating the direction of motion of the cursor by looking at two successive positions separated by a short time interval. From this information a direction vector is established and the cursor is automatically placed at the next possible target along that linear direction. Several problems exist with this method primarily because more than one button may exist along a given linear direction, giving the resulting cursor movement a "jumpy" feel. In addition, a user may not always desire to or actually go in a straight line direction to reach the intended target.

U.S. Pat. No. 5,508,717 of Miller discloses another approach wherein different speed factors are used for certain predetermined screen locations, so that for a given mouse speed the cursor moves more quickly when remote from certain screen objects and moves more slowly in areas near the screen objects. This, however, causes the user to experience inconsistent cursor speeds even when merely crossing a button with no intention of engaging it. This not only wastes the user's time but can be very frustrating, especially in screen areas crowded with numerous potential targets.

Accordingly, a need still exists for an input device and a method of cursor control which allows a user to engage the intended screen target quickly, easily, and smoothly, without having to temporarily engage and subsequently release unwanted targets. It is to the provision of such a device and method that the present invention is primarily directed.

SUMMARY OF THE INVENTION

Briefly described, in a preferred form the invention comprises a method of operating a computer pointing device, such as a mouse, which allows the user to move the cursor to a desired screen location quickly, easily, and naturally using the mouse. In the novel method, the location of the cursor at various times on the screen is detected. From these various positions a path of travel and a rate of travel of the cursor are computed. Display objects, such as buttons, which exist along or near the path of travel are identified and designated as potential targets. The rate of change in the rate of travel is also computed. This information is used to decide if a user is slowing down in approach of a specific display object. If certain deceleration criteria are met, then that target display object which the user is approaching is designated as the intended target display object and the cursor is translated smoothly to that target display object.

Preferably, after the pointer has been moved to the target display object, the pointer is maintained at that display object and small mouse movements are ignored, thereby allowing the user to maintain the cursor on the desired target display object despite small, possibly inadvertent, mouse movements. If the movement or acceleration of the mouse exceeds a predetermined threshold, then this hold is released.

In another preferred form, the present invention comprises a computer system including a display for displaying screen objects and a pointer, and a pointing device which operates in conjunction with the display for changing the pointer's position on the display. The computer system further comprises control means for moving the pointer to a selected display object in response to a detected decrease in speed of the pointer as the pointer approaches the selected display object.

Preferably, the computer system's control means also maintains the pointer on the selected display object despite small movements by the pointing device and further the control means releases the pointer from the selected display object when the movements of the pointing device exceed a predetermined threshold value.

The present invention allows the user to engage a desired screen target easily. Also, the user is able to move the cursor quickly and easily across large areas of empty screen. Unlike the prior art, the user is able to move equally quickly over unintended targets and is able to engage the desired target directly, even if that target exists in a target-rich area of the screen.

Accordingly, it is a primary object of this invention to provide a method and apparatus for cursor pointing in a graphics user interface environment which allows the user to reach an intended screen object quickly and easily.

It is another object of the present invention to provide a method and apparatus which allows the user to move freely over blank computer screen areas, as well as over unintended targets.

It is another object of the present invention to provide a method and apparatus for cursor control which allows a cursor to be held securely on a selected screen object despite small or unintended movements of the pointing device.

It is another object of the present invention to provide a method and apparatus for cursor control which is elegant in its execution, reliable in operation, and economical in manufacture.

These and other objects, advantages, and features of the invention will become apparent to those knowledgeable in this field when the following description is considered.

DETAILED DESCRIPTION OF THE PREFERRED EMBODIMENTS

Figure 1:
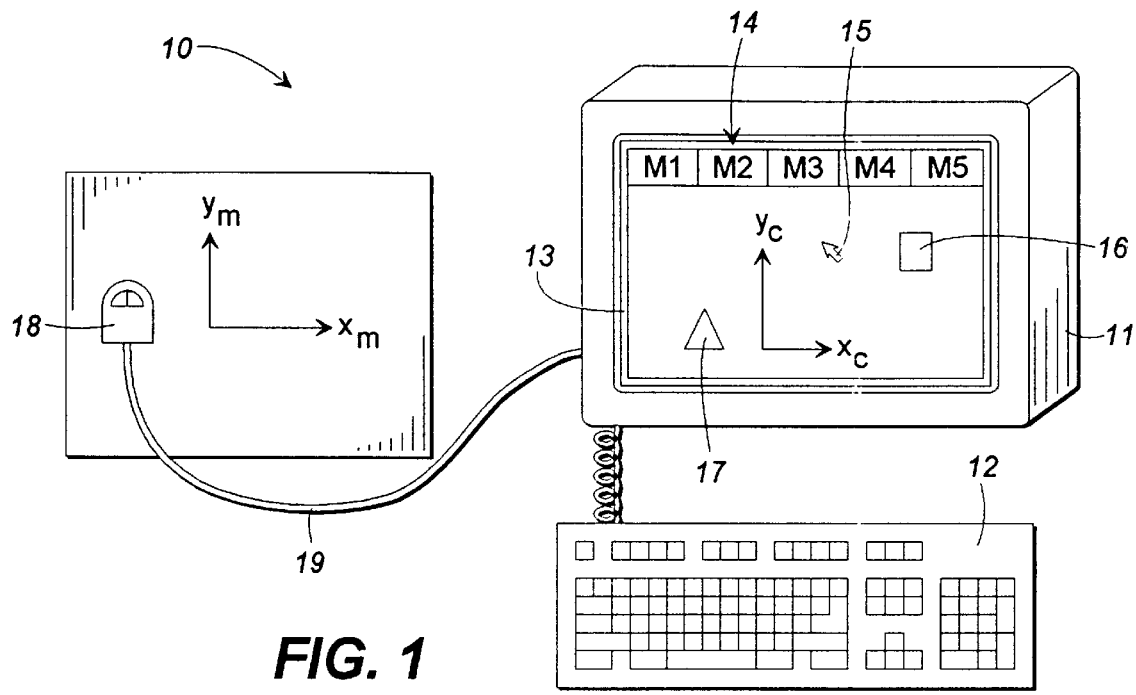
FIG. 1 is a schematic illustration of a computer system according to the present invention in one preferred form.

Referring now to the drawing figures, wherein like reference numerals represent like parts throughout the several views, FIG. 1 shows a computer system 10 embodying the present invention. The computer system 10 includes a display 11 and an input device in the form of a keyboard 12. The computer system is provided with a graphic user interface (GUI). The CPU, keyboard, and display on the computer system 10 are widely known and can take numerous forms. The display 11 displays various screen objects, such as window 13, pull down menus indicated generally at 14, and screen buttons 16 and 17. The display also displays a cursor 15. The cursor depicted is in the form of an arrow pointer, but other shapes of cursors or pointing indications can be employed.

The computer system 10 also includes a second input device in the form of a mouse 18 connected to the computer system by a cable 19. The mouse can be a single button unit, two button unit, three button unit, etc. Such a mouse is widely known and commercially available. As is common in the prior art, movements of the mouse in two dimensions on a flat surface are monitored to generate movements of the cursor or pointer 15 on the display 1 1. Movement of the cursor 15 on the screen 11 corresponds generally to the movement of the mouse 18 by the following relationship:

$$\dot{x}_c = S\dot{x}_m$$

$$\dot{y}_c = S\dot{y}_m$$

where $\dot{x}_m(\dot{y}_m)$ represents the speed of the mouse 18 in the x(y) directions on the two-dimensional flat surface and $\dot{x}_c(\dot{y}_c)$ represents the speed of the cursor 15 on the screen 11. The mathematical constant (a speed factor) s is a predetermined ratio.

When the user positions the mouse 18 directly over a soft-button 16 (for example) he or she wishes to engage, a button or switch on mouse 18 is used to signal the computer's CPU to execute that portion of the program associated with soft-button 16.

Figure 2:
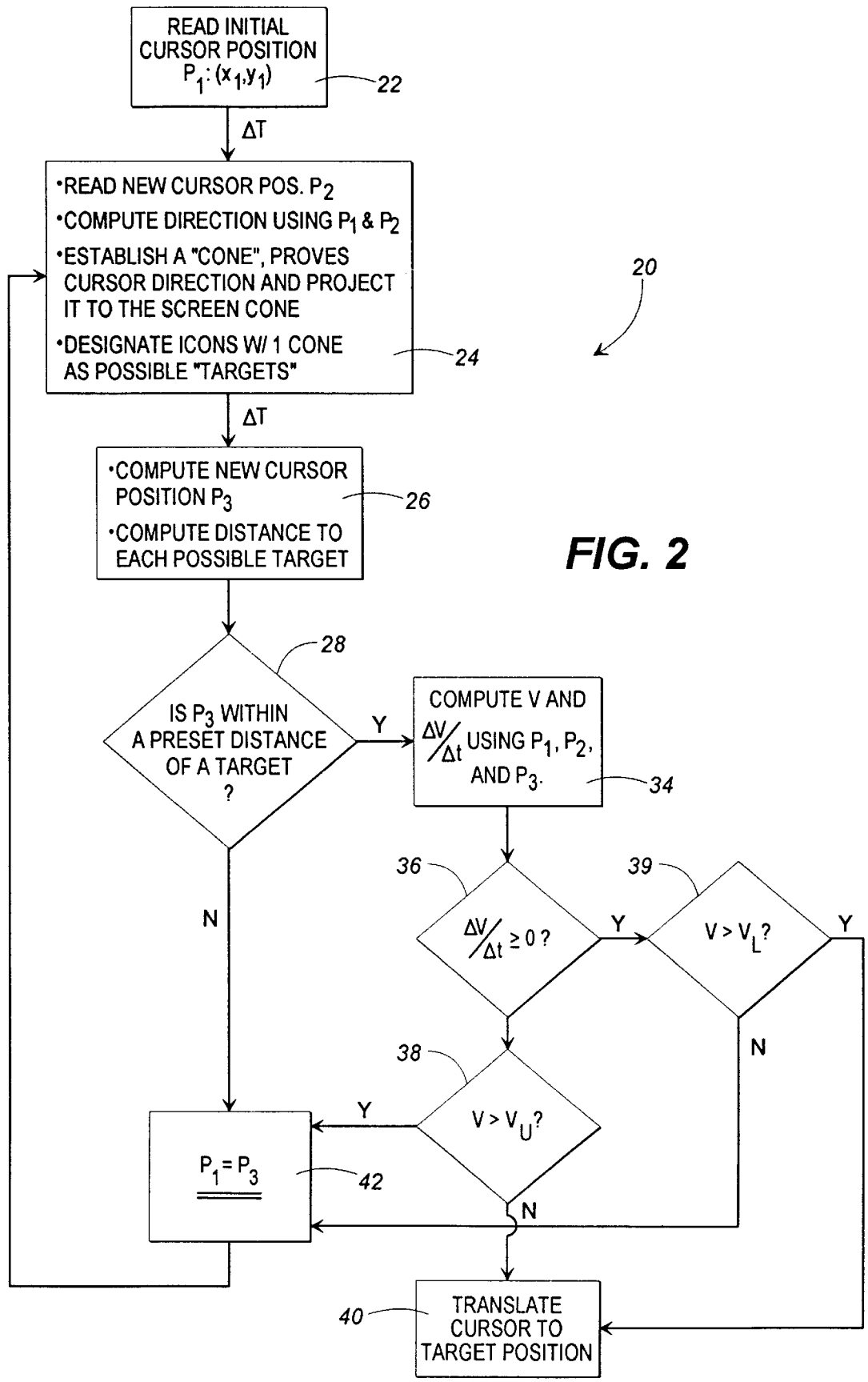
FIG. 2 is a flow chart depicting steps carried out in a method of operating the computer system of FIG. 1.

Referring now to FIG. 2, the method 20 according to the present invention is depicted. The method 20 is executed using the computer system 10 of FIG. 1. Simply stated, in the novel method 20, the location of the cursor 15 at various times on the screen 11 is detected. From these various positions, a path of travel and a rate of travel of the cursor 15 are computed. Display objects, such as the buttons 16 and 17, which may exist along or near the path of travel are identified and designated as potential targets. A rate of change in the rate of travel (acceleration or deceleration) is also calculated. This information is used to decide if a user of the computer system 10 is slowing down in approach of a specific display object. If deceleration criteria is met, then that target display object which the user is approaching is designated as an intended display object or target display object and the cursor 15 is translated smoothly to that target display object. After the pointer has been moved to the target display object, the pointer is maintained at that display object and small movements of the mouse 18 are ignored. This allows the user to maintain the cursor 15 on the desired display object despite small, inadvertent mouse movements. If the movement or acceleration of the mouse 18 exceeds a predetermined threshold, then the "hold" on the cursor 15 at the display object is released.

Referring now with more specificity to FIG. 2, in the first program step 22, the computer system 10 determines an initial position $P_1$ of the cursor 15. The initial position is read as a two-dimensional coordinate $(x_1, y_1)$. After a time interval $\Delta t_1$, which can be very small compared to other time intervals in the system, a new cursor position $P_2$ is determined, as shown in program step 24.

Figure 3:
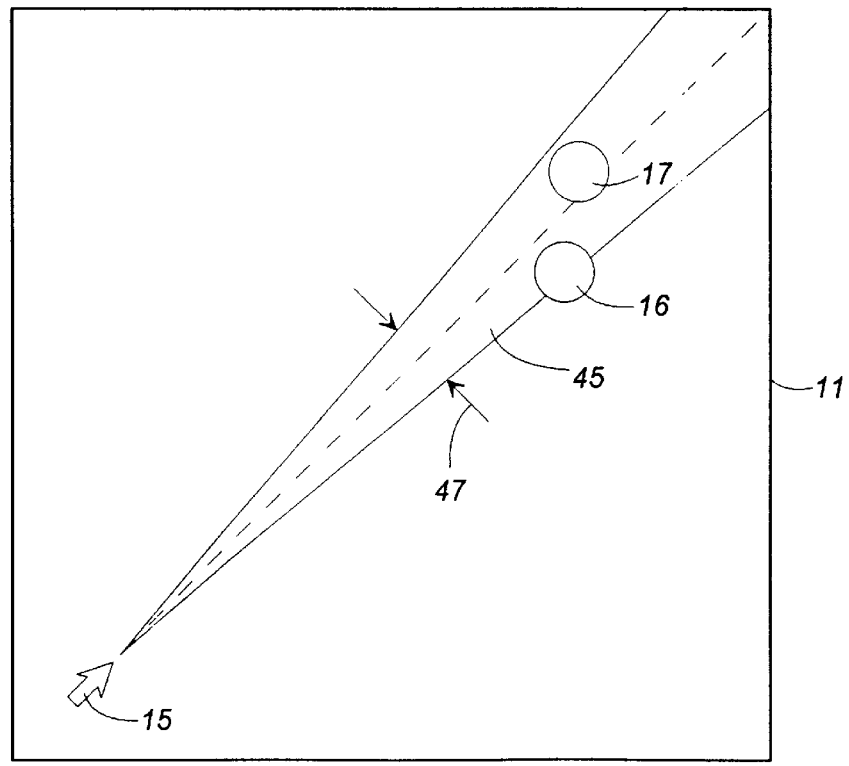
FIG. 3 shows one aspect of one of the steps according to the method of FIG. 2.

From $P_1$ and $P_2$, in this embodiment, the linear travel direction of the cursor 15 is determined. An angular factor is preset which represents a possible user error in direction. This factor forms a wedge-shaped enclosure around the calculated direction. This is referred to as the "cone" 45 as depicted in FIG. 3. The "spread" or angle 47 of the cone 45 can be varied. The cone 45 is projected to the screen edge and any buttons or pull down menus or other active screen objects which fall within the cone 45 are designated as possible targets.

After an additional time step $\Delta t_2$, a third cursor position $P_3$ is computed as depicted in program step 26. At this point, in the preferred embodiment, each possible target can be tested to determine if the cursor 15 is within some preset distance (relative to each possible target). If no target is within range, $P_3$ becomes the new $P_1$ and the process begins again at program step 24 as shown in block 32. If a possible target is within the preset range, then both the speed and acceleration of the cursor 15 are computed using $P_1$, $P_2$, and $P_3$ as shown in program block 34.

Cursor acceleration is evaluated, as shown in block 36, to determine if it is negative. If acceleration is negative, then the user is decelerating as the cursor 15 approaches the potential target. If the change in velocity is negative, in one embodiment, a speed criteria may also be applied. In such a case, if the cursor speed is above some upper threshold value, as shown in block 38, then the program assumes that the user does not intend to engage that target. If, on the other hand, the velocity is below that threshold and decelerating, then the target is assumed to be the intended one and the cursor 15 is automatically (and smoothly) translated to the target position, as shown in block 40. Similarly, if the cursor acceleration is positive, a lower velocity threshold may be tested, as shown in block 39. If the velocity is below this threshold, then the target is assumed to be the intended one, regardless of the acceleration, and the cursor will be smoothly translated to the target position as shown in block 40. If these criteria are not met, again $P_3$ becomes the new $P_1$ and the process begins again, as shown in block 42.

FIG. 3 shows the "cone" 45 around the linear travel direction of the cursor 15. Buttons 16 and 17 are depicted within cone 45 and are, therefore, designated as possible targets.

The implementation of these steps can be done in any number of ways. For example, the size of the cone could be software-specific. The order of evaluating velocity and acceleration can be reversed, or the time intervals can be varied.

In another embodiment, a dual speed factor system, somewhat similar to that which exists in the prior art, could be used in conjunction with this invention. The problems which exist in the prior art, however, would be eliminated in that the specific intended target would be the only area of the screen in which the lower speed factor would be triggered rather than around simply any target as in the prior art.

In yet another possible embodiment, the software could allow the user to maintain forward movement control of the cursor 15 even after the intended target has been identified, but the direction of cursor movement could be fixed in a straight line between the cursor position and the intended target.

The present invention allows the user to engage a desired screen object easily. Also, the user is able to move the cursor quickly and easily across large areas of empty screen without being slowed down by unintended screen objects. The invention also allows the user to directly and easily engage a desired screen object even in areas of the screen that have numerous screen objects. The invention also allows the cursor to be held securely on a selected screen object despite small or on intended movements of the mouse. This approach is elegant in its simplicity and should prove to be reliable in operation and economical to manufacture.

While the present invention has been described in conjunction with certain preferred embodiments, many alternatives, permutations, modifications, or variations will be apparent to those skilled in the art of computers, without departing from the spirit and scope of the invention as set forth in the appended claims.

I claim:

1. A method of operation of a computer pointing device, comprising the steps of:

detecting locations of a pointer on a display at various times, where the location of the pointer is generally controlled by the computer pointing device;

evaluating the detected locations of the pointer to determine a path of travel, a rate of travel, and a rate of change of the rate of travel;

detecting display objects on the display along the path of travel; and evaluating the path of travel, the rate of change in the rate of travel, and the detected display objects to determine whether the pointer is slowing down in approach of one of the display objects along the path of travel, and, if so, moving the pointer on the display to the one of the display objects.

2. A method as claimed in claim 1 further comprising the step of, after the pointer has been moved to the one of the display objects, maintaining the pointer at the one of the display objects despite small movements of the computer pointing device and releasing the pointer when a movement of the computer pointing device exceeds a certain threshold value.

3. The method of claim 2 wherein the threshold value comprises a predetermined distance.

4. The method as claimed in claim 1 wherein the step of moving the pointer on the display comprises moving the pointer on the display to a nearest one of the display objects along the path of travel.

5. The method as claimed in claim 4 wherein the step of moving the pointer comprises moving the pointer to a nearest active display object.

6. A computer system having a graphical user interface and comprising:

a central processing unit;

a display for displaying screen objects and a pointer;

a pointing device which operates in conjunction with said display for changing said pointer's position on the display; and control means for monitoring the position and speed of said pointer and for moving said pointer to a selected display object in response to a detected decrease in speed of said pointer as said pointer approaches said selected display object.

7. A computer system as claimed in claim 6 wherein said control means are provided also for maintaining said pointer on said selected display object despite small movements by said pointing device and for releasing said pointer from said selected display object when movements of said pointing device exceed a predetermined threshold value.

8. A computer system as claimed in claim 6 wherein said control means evaluates a path of travel of said pointer and detected display objects for moving said pointer to said selected display object in response to said detected decrease in speed of said pointer, said path of travel, and said detected display objects.

9. A computer system as claimed in claim 8 wherein said control means further evaluates the status of said detected display objects.

10. A computer system as claimed in claim 8 wherein said control means moves said pointer to a nearest one of said detected display objects.

* * * * *